(12) United States Patent
van't Westeinde et al.

(10) Patent No.: US 11,132,631 B2
(45) Date of Patent: Sep. 28, 2021

(54) COMPUTERIZED SYSTEM AND METHOD FOR RESOLVING CROSS-VEHICLE DEPENDENCIES FOR VEHICLE SCHEDULING

(71) Applicant: ORACLE INTERNATIONAL CORPORATION, Redwood Shores, CA (US)

(72) Inventors: Charles P. van't Westeinde, Melbourne (AU); Svetlana Mizina, Melbourne (AU); Marina Zoubtchenko, Melbourne (AU)

(73) Assignee: Oracle International Corporation, Redwood Shores, CA (US)

( * ) Notice: Subject to any disclaimer, the term of this patent is extended or adjusted under 35 U.S.C. 154(b) by 814 days.

(21) Appl. No.: 15/606,084

(22) Filed: May 26, 2017

(65) Prior Publication Data

US 2018/0341893 A1  Nov. 29, 2018

(51) Int. Cl.
G06Q 10/06  (2012.01)

(52) U.S. Cl.
CPC ... *G06Q 10/06312* (2013.01); *G06Q 10/0633* (2013.01); *G06Q 10/06314* (2013.01); *G06Q 10/063116* (2013.01); *G06Q 10/063118* (2013.01)

(58) Field of Classification Search
None
See application file for complete search history.

(56) References Cited

U.S. PATENT DOCUMENTS

| | | | |
|---|---|---|---|
| 8,543,438 B1 | 9/2013 | Fleiss | |
| 2006/0167733 A1* | 7/2006 | Scott | G06Q 10/0631 705/7.12 |
| 2007/0021998 A1* | 1/2007 | Laithwaite | G06Q 10/06311 705/7.13 |
| 2010/0100632 A1* | 4/2010 | Qureshi | H04L 63/105 709/229 |

(Continued)

OTHER PUBLICATIONS

Wikipedia, Coffman-Graham algorithm—pp. 1-3; downloaded on May 22, 2017 from: http://en.wikipedia.org/wiki/Coffman%E2%80%93Graham_algorithm.

(Continued)

*Primary Examiner* — Akosua Kyereme-Tuah
(74) *Attorney, Agent, or Firm* — Kraguljac Law Group, LLC

(57) ABSTRACT

Systems, methods, and other embodiments associated with computing and assigning a task to be performed using a resource at a candidate time are described. In one embodiment, a method includes accessing a scheduling data structure and analyzing data records for tasks, upon which the resource depends, to be performed using one or more other resources, and tasks, upon which other resources depend, to be performed using the resource. A candidate time for performing the task using the resource is calculated based upon dependencies determined between various tasks, and a candidate schedule is generated using the candidate time for the task. The scheduling data structure is modified and regenerated based upon the candidate schedule if the candidate schedule is determined to have a greater performance score than an existing schedule.

18 Claims, 8 Drawing Sheets

(56) References Cited

U.S. PATENT DOCUMENTS

| | | |
|---|---|---|
| 2011/0161964 A1 | 6/2011 | Piazza et al. |
| 2016/0026935 A1 | 1/2016 | Botea et al. |
| 2016/0123618 A1* | 5/2016 | Hester .................... F24F 11/62 |
| | | 700/276 |
| 2016/0307145 A1 | 10/2016 | Banerjee et al. |
| 2017/0300869 A1* | 10/2017 | Johnson ............. G06Q 10/1093 |
| 2018/0174086 A1* | 6/2018 | Spiro ................. G06F 11/3476 |

OTHER PUBLICATIONS

Patent Cooperation Treaty (PCT) International Search Report and Written Opinion in co-pending PCT International Appl. No. PCT/US2018/034338 (International Filing Date of May 24, 2018) dated Aug. 3, 2018 (14 pages).

* cited by examiner

SCHEDULING DATA STRUCTURE — 130

| TASK (305) | RESOURCE (310) | ASSIGNED TIME SLOTS (315) | DEPENDS UPON (320) | IS DEPENDED UPON BY (325) |
|---|---|---|---|---|
| TASK (1) | RESOURCE (1) | ? | TASK (2) | TASK (3) |
| TASK (2) | RESOURCE (2) | 11/1/16 2PM-3PM | TASK (4) | TASK (1) |
| TASK (3) | RESOURCE (3) | 11/1/16 8PM-9PM | TASK (1) | N/A |
| TASK (4) | RESOURCE (4) | 11/1/16 12PM-1PM | N/A | TASK (2) |
| TASK (5) | RESOURCE (5) | 11/2/16 09AM-11AM | N/A | N/A |

● ● ●

FIG. 3

COMPUTERIZED SYSTEM AND METHOD FOR RESOLVING CROSS-VEHICLE DEPENDENCIES FOR VEHICLE SCHEDULING

BACKGROUND

Computing devices are used to implement various services and products. A computing device may provide a scheduling service, such as scheduling of tasks to be performed using vehicles. Scheduled tasks may be stored within databases or other storage structures of a distributed network environment (e.g., a cloud service), or within databases or other storage structures of a local computer. A user may interact with the computing device to perform operations upon the scheduled tasks. For example, the computing device may be used to add new tasks, to remove existing tasks, or to modify existing tasks.

Various tasks managed by the scheduling service may be scheduled to be performed using various vehicles, such that some tasks may be scheduled to be performed using a first vehicle, and other tasks may be scheduled to be performed using a second vehicle. There may be a dependency between a first task scheduled to be performed using the first vehicle and a second task scheduled to be performed using the second vehicle, which may complicate attempts to modify an existing schedule.

In order to improve the effectiveness of vehicles, the rate of successful completion of tasks, increase associated profits, and/or move inventory being delivered by the vehicles, it is desirable to efficiently identify and assign times for new tasks.

Unfortunately, typical existing techniques are limited to identifying some times, and not others that could be utilized. Thus, generating schedules has been restricted by having limited choices of time assignments.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates an embodiment of the scheduling data structure.

DETAILED DESCRIPTION

Computerized scheduling systems and methods are described herein that provide for scheduling a task(s), such as a delivery, to be performed using a resource(s), such as a vehicle, a loading bay, a crew/team, etc. In one embodiment, an electronic schedule is a data structure configured with a number of time slots. The electronic schedule may include different tasks that are scheduled to be performed at different times in different time slots. However, one or more tasks may have a dependency relationship with another task. For example, a first delivery by a first vehicle may be dependent upon another delivery by a second vehicle. Thus, the first delivery may need to be performed after performance/completion of the other delivery by the second vehicle. These types of dependencies affect and/or restrict how the tasks are scheduled in the electronic schedule.

When a user attempts to schedule a new task via the scheduling system, the user may provide input about the new task, such as a resource to be used to perform the new task, a dependency relationship between the new task and another task, and a deadline by which the new task needs to be completed. The system tries to identify a time (time slot in the electronic schedule) to which a task is not assigned to the resource, and presents the time for the new task on a display screen. However, if the new task needs to be urgently completed by an upcoming deadline, there may be no time vacant for the resource in the electronic schedule prior to the deadline of the new task. Alternatively, if the new task depends upon another (e.g., existing) task and needs to be performed within a (required) threshold period of time (e.g., within 3 hours of completion of the other task), there may be no time vacant (no free time slots) within the threshold period of time of the other task.

Thus, in order to complete the new task prior to the deadline or within the threshold period of time of the other task, one or more existing tasks may need to be moved in the electronic schedule. Unfortunately, a typical schedule may involve a large number of tasks that are linked with complex dependencies, which may often be difficult to sift through, assess and modify. Accordingly, users cannot themselves easily or accurately move existing tasks to different time slots to make a time available for a new task in accordance with the dependencies without causing time conflicts. In one embodiment, the present scheduling system is configured to generate schedules for tasks to address this issue.

Figure 1:
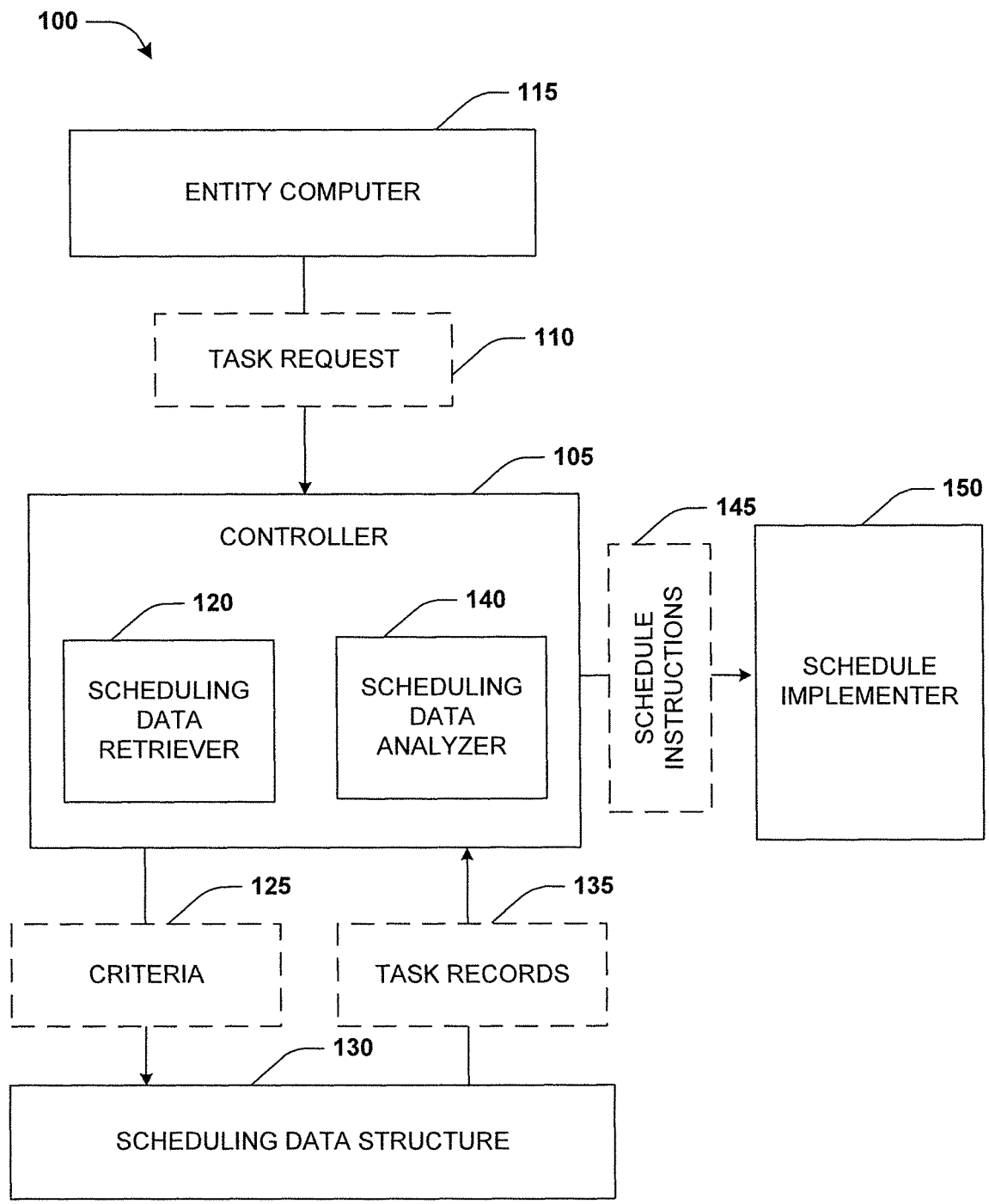
FIG. 1 illustrates an embodiment of a system associated with assigning a task to be performed using a resource at a candidate time.

With reference to FIG. 1, one embodiment of a computerized system 100 associated with assigning a task to be performed using a resource at a candidate time is illustrated. The system 100 includes a controller 105, which may be configured to execute on a computer. The controller 105 may be initiated based upon a task request 110 being received from an entity computer 115, such as a computer of a vehicle-based delivery service that is requesting a task to be scheduled to be performed using a resource. For example, the task may be an appointment to deliver a first package to a loading bay, and pick up a second package from the loading bay. The controller 105 may receive the task request 110 over a network connection.

A scheduling data retriever 120 is configured to analyze the task request 110 and identify data within that identifies the task and associated parameters. The controller 105 utilizes the scheduling data retriever 120 to generate criteria

125 for existing task records to be considered for the task request 110. The criteria 125 may specify other tasks that depend upon the task, such as a second appointment to pick up the first package from the loading bay, and other tasks that the task depends upon, such as a third appointment to deliver the second package to the loading bay. In some examples, the criteria 125 may further specify information about the resource(s) to be used to perform the task, such as a first vehicle that is to deliver the first package and pick up the second package, and the loading bay.

The criteria 125 may specify a time frame within which the task needs to be scheduled. For example, the time frame may be determined based upon the task request 110, and may specify a starting point in time on or after which the task may be scheduled and an ending point in time on or prior to which the task may be scheduled. Alternatively, the time frame may specify the ending point in time on or prior to which the task may be scheduled without specifying the starting point in time. For example, the criteria 125 may specify "within 3 days" as the time frame, in accordance with a need of a client of the vehicle-based delivery service to have the first package delivered (to a first recipient) and the second package delivered (to a second recipient) within 3 days.

The criteria 125 may further specify a threshold priority (level). The criteria 125 may further specify a medium priority as the threshold priority. For example, the task may have a medium priority, and the vehicle-based delivery service may not want to modify tasks with similar or higher priority when scheduling the task, and may instead only want to consider modifying tasks with a lower priority. In another example, a value of the client to the vehicle-based delivery service may be a medium value, and the vehicle-based delivery service may not want to modify tasks associated with customers that are of similar or higher value to the vehicle-based delivery service, and may instead only want to consider modifying tasks associated with customers that are of lower value to the vehicle-based delivery service.

In another example, the priority of the (new) task may be indicative of a level of (e.g., processor, memory, etc.) resources that are to be allocated to scheduling the task. For example, the higher the priority of the task, the greater the number of time slots and tasks of a scheduling data structure 130 that are to be considered when scheduling the task, and thus the more (e.g., processor, memory, etc.) resources are allocated to identify times (time slots in the scheduling data structure 130) and tasks when scheduling the task.

In some examples, a task that is to be performed using two resources is represented in the scheduling data structure 130 as two tasks. In the examples, a task that is to be performed using a vehicle and a loading bay is represented as a vehicle task and a loading bay task. In other examples, a task that is to be performed using two resources is represented in the scheduling data structure 130 as a single task.

The criteria 125 is used to analyze the scheduling data structure 130 in order to identify task records 135 for a plurality of resources (vehicles, loading bays, etc.). The task records 135 may include the records for a first set of tasks in the scheduling data structure 130 that the resource (and/or the task) depends upon, and that are to be performed using other resources (different than the resource performing the task). For example, the third appointment for a second vehicle to deliver the second package to the loading bay may be identified in the scheduling data structure 130 for inclusion in the task records 135, as performance of the task by the first vehicle (in particular, picking up the second package from the loading bay) depends upon the second vehicle delivering the second package to the loading bay prior to arrival of the first vehicle at the loading bay. The task records 135 may also include the records for a second set of tasks in the scheduling data structure 130 that other resources depend upon, and that are to be performed using the resource (that is to perform the task). For example, the second appointment for a third vehicle to pick up the first package from the loading bay may be identified in the scheduling data structure 130 for inclusion in the task records 135, as picking up the first package by the third vehicle depends upon performance of the task by the first vehicle (in particular, delivering the first package to the loading bay) prior to arrival of the third vehicle at the loading bay.

The controller 105 utilizes the scheduling data analyzer 140 to analyze the task records 135 for the determination of dependencies between the first set of tasks and the second set of tasks. The task records 135 may each be considered to identify time(s) that the task can be performed. For example, the third appointment for the second vehicle to deliver the second package to the loading bay may be determined to be scheduled for 2 pm on May 3, while the second appointment for the third vehicle to pick up the first package from the loading bay may be determined to be scheduled for 5 pm on May 3.

A determination may be made that if the task is scheduled for 12 pm on May 3, the first vehicle will be unable to pick up the second package, as required by the task, without delaying departure from the loading bay for a period of time exceeding a threshold or without returning to the loading bay a second time. A determination may also be made that if the task is scheduled for 6 pm on May 3, the third vehicle will be unable to pick up the first package, as required by the second appointment, without delaying departure from the loading bay for a period of time exceeding a threshold or without returning to the loading bay a second time. A determination may also be made that if the task is scheduled for 4 pm on May 3, the third vehicle will be able to pick up the first package, as required by the second appointment, without delay, and the first vehicle will be able to pick up the second package, as required by the task, without delay. Thus, 4 pm on May 3 may be calculated as being a candidate time for performing the task using the resource (the first vehicle). In one embodiment, the candidate time is calculated based upon a determination that the task will be performed within a first threshold period of time (3 hours) of performance of tasks that the task depends upon and/or within a second threshold period of time (2 hours) of performance of tasks that depend upon the task.

The controller 105 utilizes the scheduling data analyzer 140 to generate a candidate schedule for the plurality of resources identified in the task records 135. The candidate schedule includes the candidate time for the task to be performed using the resource. The candidate schedule may also include updated times for some tasks (deliveries, pick ups, etc.) to be performed using some resources and existing times for other tasks (deliveries, pick ups, etc.) to be performed using other resources. In some examples, the candidate schedule includes calculated timings associated with tasks given certain assignments of the tasks and/or a sequence of the tasks.

The controller 105 utilizes the scheduling data analyzer 140 to evaluate the candidate schedule to calculate a candidate schedule performance score. For example, the candidate schedule performance score may be based upon a number of conflicts between tasks, a number of delays, and/or a number of repeat trips caused due to dependencies between tasks and/or resources predicted to result from implementation of the candidate schedule. In another example, the candidate schedule performance score may be based upon temporal flexibility (room for error) available between dependent tasks in the candidate schedule (e.g., 2 hours of temporal flexibility between the delivery of the second package to the loading bay by the second vehicle at 2 pm and the task at 4 pm).

The controller 105 utilizes the scheduling data analyzer 140 to compare the candidate schedule performance score to an existing schedule performance score of an existing schedule (for the plurality of resources). The existing schedule may have already been implemented across the plurality of resources when the task request 110 is received by the controller 105. In response to determining that the candidate schedule performance score is greater than the existing schedule performance score, the scheduling data structure 130 is modified and regenerated, based upon the candidate schedule, to assign the task to be performed using the resource (the first vehicle) at the candidate time (4 pm on May 3).

If, instead, a determination is made that the candidate schedule performance score is not greater than the existing schedule performance score, the existing schedule is preserved, the candidate schedule is discarded, and a new candidate schedule (with a new candidate time for performing the task using the resource) is generated and evaluated. In some examples, the scheduling data structure 130 is only modified and regenerated based upon the candidate schedule if the candidate schedule performance score is greater than the existing schedule performance score by a threshold margin.

In some examples, as part of the calculation of the candidate time and/or the generation of a candidate schedule, a proposed start time and a proposed completion time of each task of a plurality of a tasks is (repeatedly) recalculated based upon a completion time of a (previously calculated) predecessor task. The recalculation may be performed using an algorithm, which as part of (one or more iterations of) the calculation of the candidate time, the generation of a candidate schedule and/or the comparison of the candidate schedule performance score to the existing schedule performance score, cycles through one or more (e.g., all) tasks to recalculate a proposed completion time of each task based upon predecessor tasks. The algorithm continues cycling through the tasks until the times of the one or more tasks are no longer changed.

The controller 105 generates schedule instructions 145, including a portion of the regenerated scheduling data structure 130 corresponding to the candidate schedule, to provide to, and thus control, the schedule implementer 150. The schedule instructions 145 may thus provide for the schedule implementer 150 to instruct the first vehicle to deliver the first package to the loading bay, and pick up the second package from the loading bay at 4 pm on May 3 (the candidate time), instruct the second vehicle to deliver the second package to the loading bay at 2 pm on May 3, and instruct the third vehicle to pick up the first package from the loading bay at 5 pm on May 3.

It may be appreciated that tasks with higher priorities may be associated with a greater probability of not being movable to an alternative time slot than tasks with lower priorities. That is, in an example, even though it may be likely that a task with a priority higher than the threshold priority is movable to an alternative time slot, it is more likely that another task with a priority lower than the threshold priority is movable to an alternative time slot. Thus, it is more efficient to consider the other task first. Using this heuristic approach, an appropriate time slot may be identified using less processing power, less memory usage, less database accessing, etc.

In one embodiment, the system 100 is a computing/data processing system including an application or collection of distributed applications for enterprise organizations. The applications and system 100 may be configured to operate with or be implemented as a cloud-based networking system, a software as a service (SaaS) architecture, or other type of networked computing solution. In one embodiment the system 100 is a centralized server-side application that provides at least the functions disclosed herein and that is accessed by many users via computing devices/terminals communicating with the system 100 (functioning as the server) over a computer network.

Figure 2:
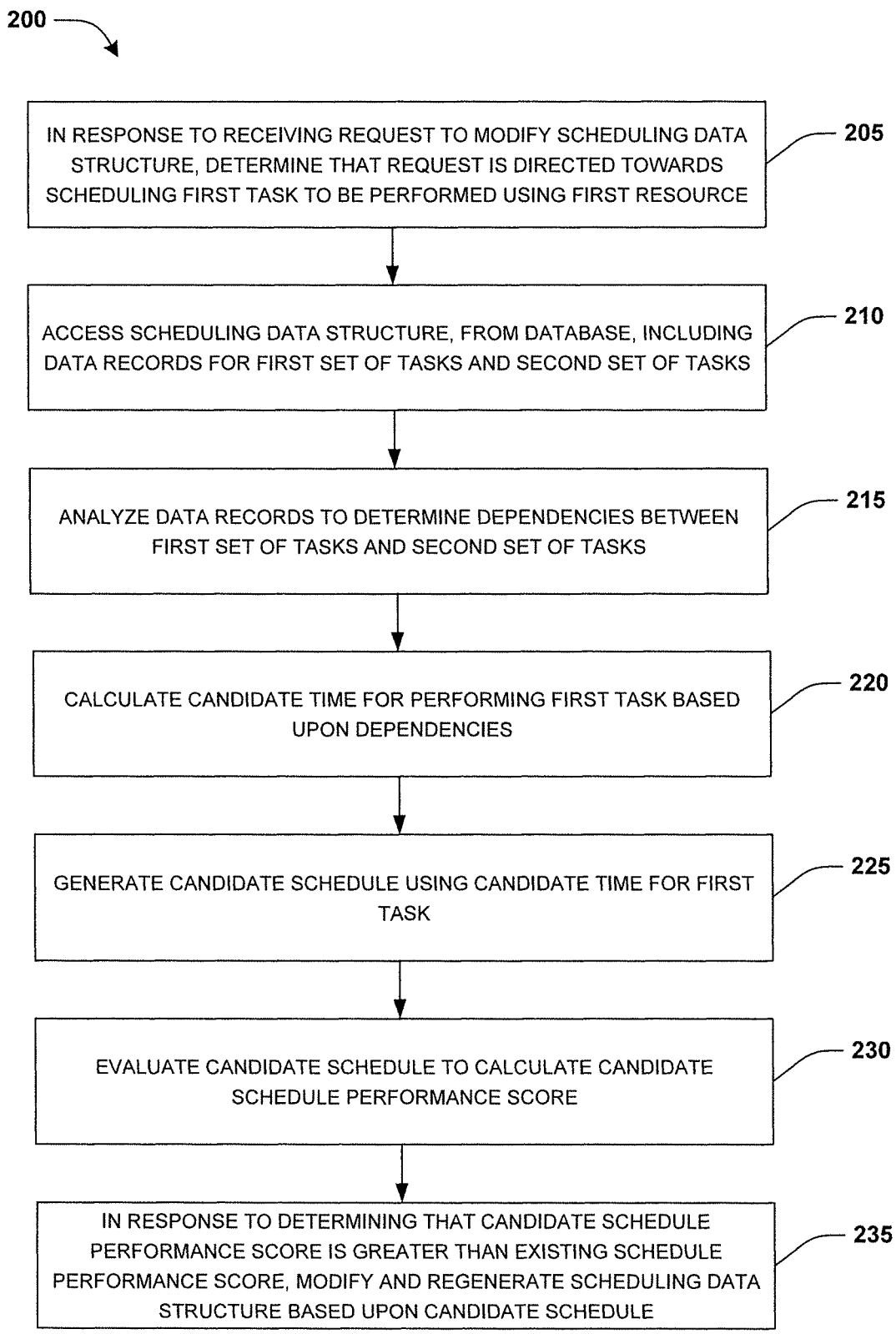
FIG. 2 illustrates an embodiment of a method associated with assigning the task to be performed using the resource at the candidate time.

FIG. 2 illustrates one embodiment of a computer-implemented method 200 associated with assigning a first task to be performed using a first resource at a candidate time. In one embodiment, method 200 is performed by the controller 105 utilizing various computing resources of the computer 805 (shown in FIG. 8), such as the processor 810 for executing instructions, memory 815 and/or disks 830 for storing data structures within which control instructions are generated, and/or network hardware for transmitting data structures to remote computers over networks. The method 200 may be triggered based upon various triggers, such as receipt of the task request 110 from the entity computer 115, etc.

At 205, the task request 110 is received, and in response to receipt of the task request 110, a determination is made that the task request 110 is directed towards scheduling a task (digging a hole) to be performed using a resource (a first crew). In some examples, the task request 110 is received by a server (hosting the controller 105), from the entity computer 115.

Figure 4:
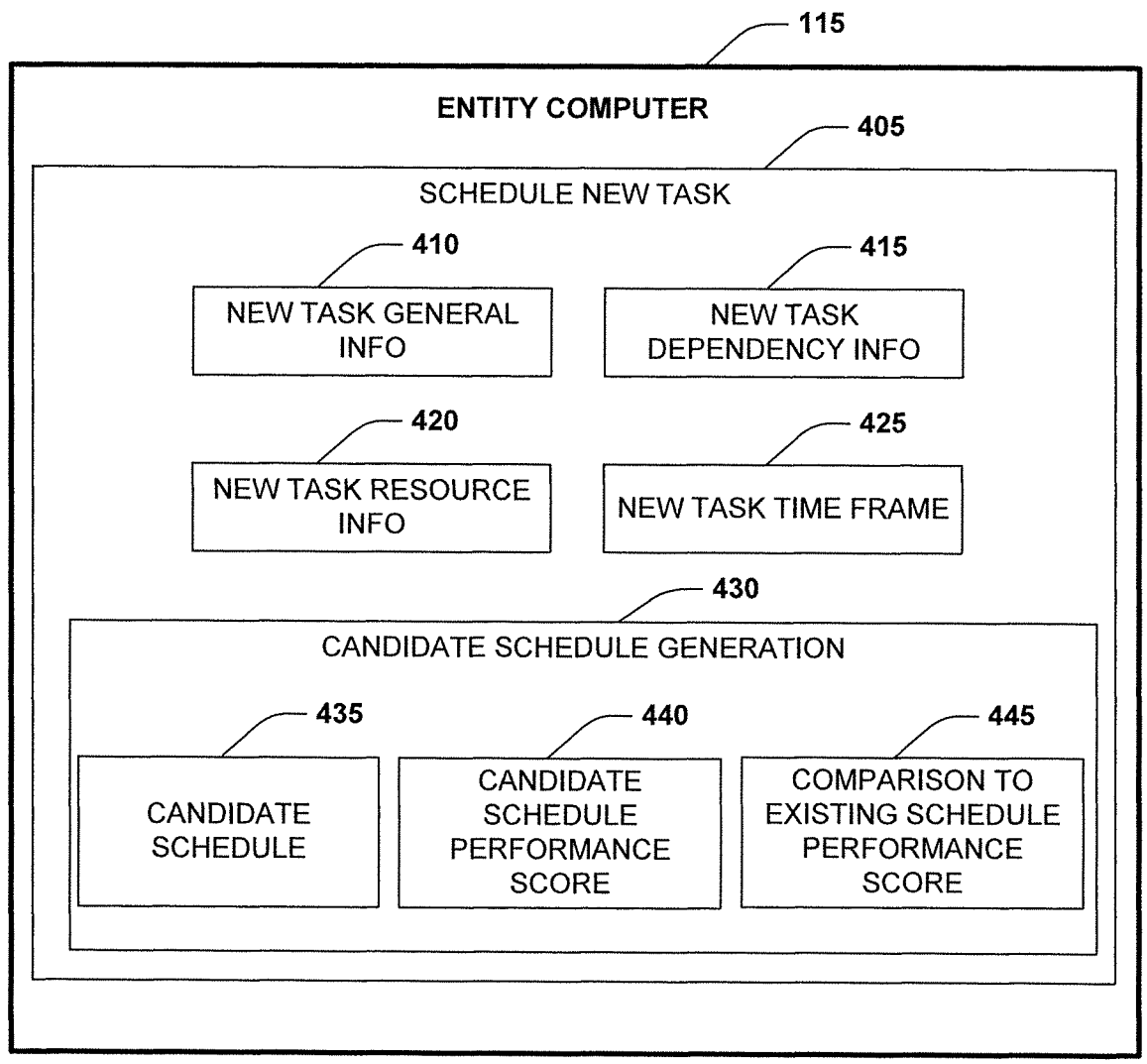
FIG. 4 illustrates an embodiment of an entity computer and a graphical user interface.

FIG. 4 illustrates one embodiment of a graphical user interface 405 on the entity computer 115 that may be used to generate the task request 110. The graphical user interface 405 is controlled to display a first graphical object 410, a second graphical object 415, a third graphical object 420, a fourth graphical object 425 and a fifth graphical object 430. The first graphical object 410 is configured to receive user input that selects general information, such as a location, of the first task. The second graphical object 415 is configured to receive user input that selects dependency information of the first task, such as an indication of the first task being dependent upon another task. The third graphical object 420 is configured to receive user input that selects resource information about the first resource (the first crew) that is to perform the first task (digging the hole). The fourth graphical object 425 is configured to receive user input that selects a time frame (1 month, 1 season, 1 year, etc.) within which the first task is to be performed.

Returning to FIG. 2, at 210, the scheduling data structure 130 is accessed from a database via a network communication. One embodiment of the scheduling data structure 130 is illustrated in FIG. 3 and includes indications of a plurality of tasks 305 and a plurality of resources 310, assigned time slots 315, tasks depended upon 320 and dependent tasks 325 associated with one or more of the plurality of tasks 305. Task records 135 in the scheduling data structure 130 that correspond to the criteria 125 may be accessed (downloaded), while other task records that do not correspond to the criteria 125 may not be accessed.

The task records 135 that are accessed include a first set of tasks, upon which the first resource (the first crew) depends, to be performed using one or more other resources (other crews). For example, FIG. 3 indicates that the first task (digging the hole) is to be performed using the first resource (the first crew), and that the first task depends upon a second task (marking a location for the hole to be dug) that is to be performed using a second resource (a second crew). Accordingly, the second task is among the first set of tasks of the task records 135 that are accessed.

The task records 135 that are accessed also include a second set of tasks, upon which other resources depend, to be performed using the first resource. For example, FIG. 3 indicates that the first task (digging the hole) is depended upon by a third task (laying wire into the hole) that is to be performed using a third resource (a third crew). Accordingly, the third task is among the second set of tasks of the task records 135 that are accessed.

Returning to FIG. 2, at 215, the task records 135 are analyzed to determine dependencies between the first set of tasks to be performed using the one or more other resources and the second set of tasks to be performed using the first resource. For example, the dependencies between the first task (digging the hole), the second task (marking the location for the hole to be dug), the third task (laying wire into the hole), and other associated tasks, such as the dependence of the second task on performance of a fourth task (delivering of equipment to be used in the marking to the location) to be performed by a fourth resource (a fourth crew), may be determined.

At 220, a candidate time for performing the first task using the first resource is calculated based upon the dependencies. For example, a candidate time of 4 pm on Nov. 1, 2016 is determined for the first task (digging the hole) based upon the times and dependencies of the second task (marking the location for the hole to be dug), the third task (laying wire into the hole), and the fourth task (delivering of equipment to be used in the marking to the location). For example, the candidate time for performing the first task using the first resource may be determined to be a time after one or more tasks that the first task depends upon are to be performed, and a time before one or more tasks that depend upon the first task are to be performed. In one embodiment, the candidate time is calculated based upon a determination that the first task will be performed within a first threshold period of time of performance of tasks that the first task depends upon and/or within a second threshold period of time of performance of tasks that depend upon the first task.

At 225, a candidate schedule for the plurality of resources, including the first resource, is generated using the candidate time for the first task for the first resource. For example, the candidate schedule may assign the candidate time of 4 pm on Nov. 1, 2016 to the first task (digging the hole), may maintain the existing times for the second task, the third task, and the fourth task, and may assign updated times to one or more other tasks scheduled to be performed by the plurality of resources.

At 230, the candidate schedule is evaluated to calculate a candidate schedule performance score. In some examples, the candidate schedule performance score is based upon a number of conflicts identified (or estimated) in dependencies between the first set of tasks and the second set of tasks in the candidate schedule. Conflicts are identified where a task that depends upon another task is scheduled to be performed before the other task. For example, a conflict is determined for a fifth task that is to be performed using the first resource if the fifth task has a time before a sixth task to be performed using a sixth resource, wherein the dependencies comprise a dependency of the fifth task on the sixth task. In another example, a conflict is determined for a seventh task to be performed using the sixth resource if the seventh task has a time before an eighth task to be performed using the first resource, wherein the dependencies comprise a dependency of the seventh task on the eighth task.

Returning to FIG. 4, the fifth graphical object 430 is configured to display information about the candidate schedule generated based upon the user input received via graphical objects 410, 415, 420 and/or 425. The fifth graphical object 430 includes a sixth graphical object 435 configured to display information about the candidate schedule, a seventh graphical object 440 configured to display the candidate schedule performance score calculated for the candidate schedule, and an eighth graphical object 445 configured to display a comparison of the candidate schedule performance score calculated for the candidate schedule with an existing schedule performance score calculated for an existing schedule.

Returning to FIG. 2, at 235, in response to determining that the candidate schedule performance score is greater than the existing schedule performance score of the existing schedule, the scheduling data structure 130 is modified and regenerated, based upon the candidate schedule, to assign the first task to be performed using the first resource at the candidate time. For example, the performance of the first task using the first resource is assigned to a candidate time slot, of the candidate time, in the scheduling data structure 130. The assignment of the first task to the candidate time slot in the scheduling data structure 130 causes the first task to be performed by the first resource at the candidate time. In some examples, the scheduling data structure 130 (or the portion of the scheduling data structure 130 that is modified) is included in the schedule instructions 145, which are provided to the schedule implementer 150.

In some examples, one or more of the acts of FIG. 2 are iteratively repeated for various resources or tasks to test modifications to the schedule, incorporate the modifications that are determined to improve the schedule (by reducing conflict), and discard the modifications that are determined to not improve the schedule.

For example, a second candidate time for performing the second task using the second resource (different than an existing second time for the second task) is calculated based upon one or more dependencies identified between the tasks to be performed using the plurality of resources. For example, the second candidate time for performing the second task using the second resource may be determined to be a time after one or more tasks that the second task depends upon are to be performed, and a time before one or more tasks that depend upon the second task are to be performed.

A second candidate schedule for the plurality of resources, including the second resource, is generated using the second candidate time for the second task for the second resource. For example, the second candidate schedule may maintain the candidate time for the first task and the existing times for the third task and the fourth task, and may assign updated times to one or more other tasks scheduled to be performed by the plurality of resources.

The second candidate schedule is evaluated to calculate a second candidate schedule performance score. In some examples, the second candidate schedule performance score is based upon a number of conflicts identified (or estimated) in dependencies between the tasks to be performed using the plurality of resources in the second candidate schedule.

In response to determining that the second candidate schedule performance score is not greater than a second existing schedule performance score of a second existing schedule, a third candidate time for performing the second task using the second resource is calculated based upon the one or more dependencies. For example, the second candidate time and the second candidate schedule are determined to not improve the schedule, and are thus discarded, and the third candidate time is calculated for performing the second task using the second resource.

In response to determining that the second candidate schedule performance score is greater than the second existing schedule performance score of the second existing schedule, the scheduling data structure is modified and regenerated, based upon the second candidate schedule, to assign the second task to be performed using the second resource at the second candidate time. For example, the second candidate time and the second candidate schedule are determined to improve the schedule, and are thus implemented. For example, the performance of the second task using the second resource is assigned to a second candidate time slot, of the second candidate time, in the scheduling data structure 130.

The schedule implementer 150 uses the scheduling data structure 130 to cause the first task to be performed by the first resource at the candidate time, and cause one or more other tasks to be scheduled for performance at other times. In some examples, the schedule implementer 150 may provide physical/print instructions to an operator of the resources that are to be used to perform the tasks, while in other examples, the schedule implementer 150 may provide digital instructions to one or more machines configured to control the resources, such as computers of the crews or their vehicles, in accordance with the schedule instructions 145.

Figure 5:
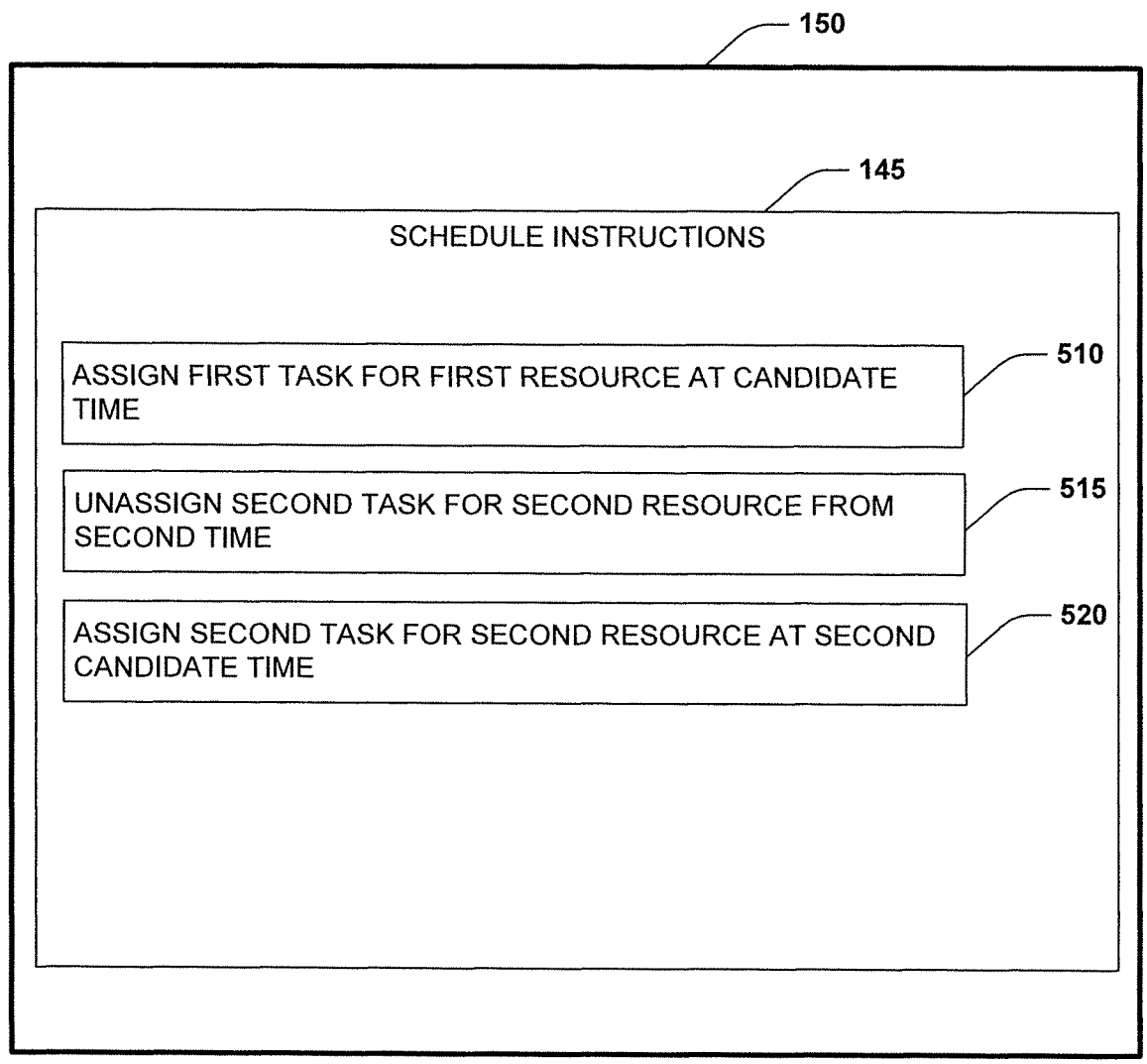
FIG. 5 illustrates an embodiment of a schedule implementer with scheduling instructions.

One embodiment of the schedule instructions 145 is shown in FIG. 5, as a data structure received by the promotional display implementer 150. The schedule instructions 145 include a first instruction 510 to assign the first task to be performed using the first resource at the candidate time, a second instruction 515 to unassign the second task to be performed using the second resource from a second time, and a third instruction 520 to assign the second task to be performed using the second resource at a second candidate time (calculated for the second task based upon the dependencies).

Figure 6:
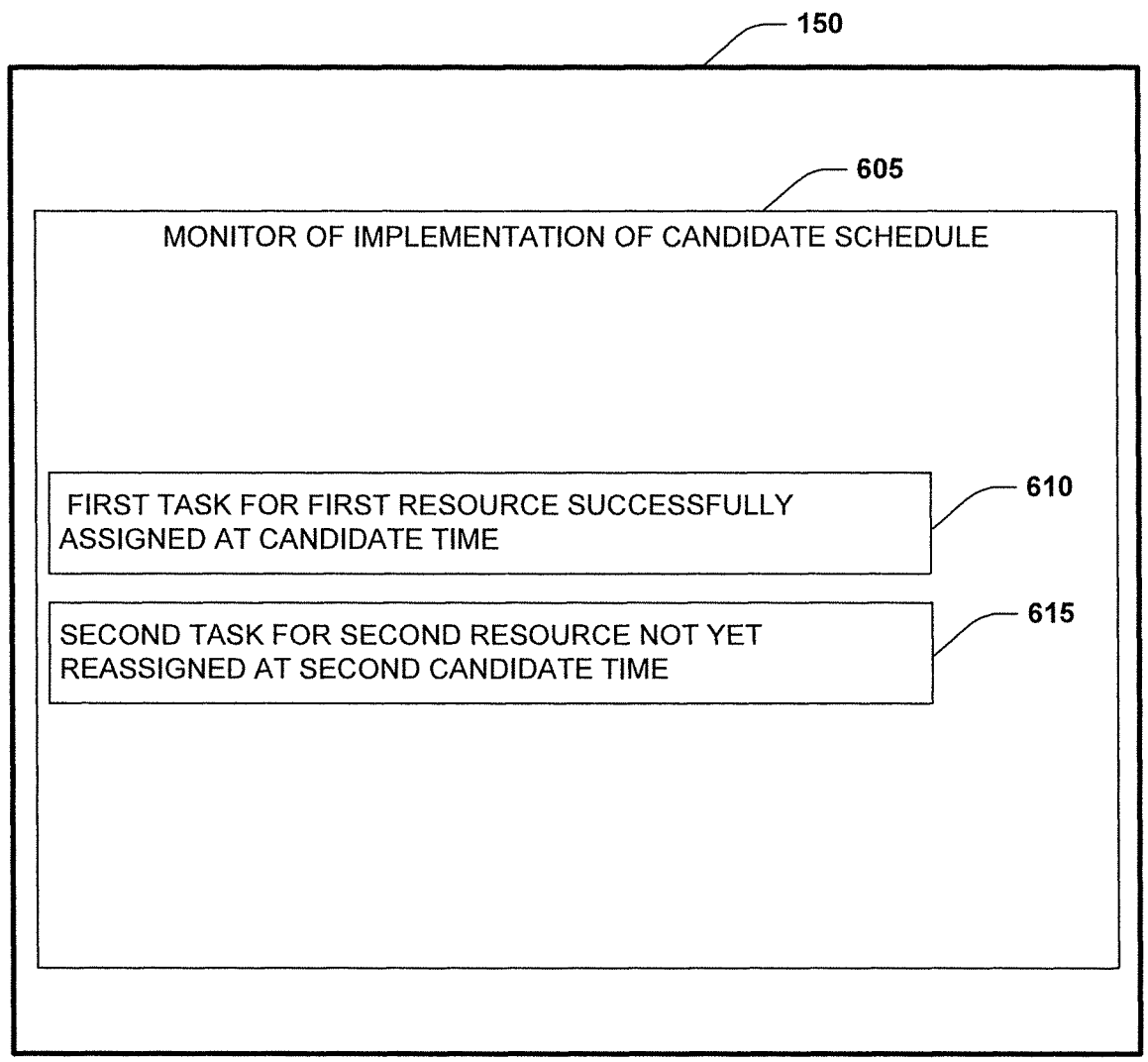
FIG. 6 illustrates an embodiment of the schedule implementer with a monitor interface.

It may be appreciated that in some examples, the schedule implementer 150 monitors the status of one or more resources, and the implementation of the candidate schedule, as illustrated in FIG. 6. The schedule implementer 150 includes a monitor interface 605, which displays a first indicator 610 displaying a status of the first task to be performed using the first resource, and a second indicator 615 displaying a status of the second task to be performed using the second resource. For example, the first indicator 610 may indicate that the first resource (the first crew) has incorporated the first task into its schedule at the candidate time in accordance with the schedule instructions 145, while the second indicator may indicate that the second resource (the second crew) has not yet incorporated the second task into its schedule at the second candidate time, and is thus not in accordance with the schedule instructions 145. In some examples, the monitor interface 605 is generated based upon user feedback indicative of impressions of users associated with the resources, while in other examples, the monitor interface 605 is generated based upon automatic analysis of the respective schedules of the resources.

In one embodiment, an algorithm used to perform at least some of the techniques disclosed herein collects one or more resources involved in a schedule, clears an event table corresponding to the schedule, processes the one or more resources collected in a first loop, calculates times for first tasks assigned to a first resource of the one or more resources, adds information about the first tasks to the event table, calculates times for second tasks assigned to a second resource of the one or more resources while taking into account the first tasks added to the event table if the second resource depends upon at least one of the first tasks, adds information about the second tasks to the event table. The algorithm iteratively repeats (e.g., hundreds of times per second) this process to gradually generate a schedule with correct (non-conflicting) dependencies and tasks. It may be appreciated that the event table may be a hash table containing estimated times for one or more tasks, and events needed to satisfy dependencies between a plurality of tasks.

Figure 7:
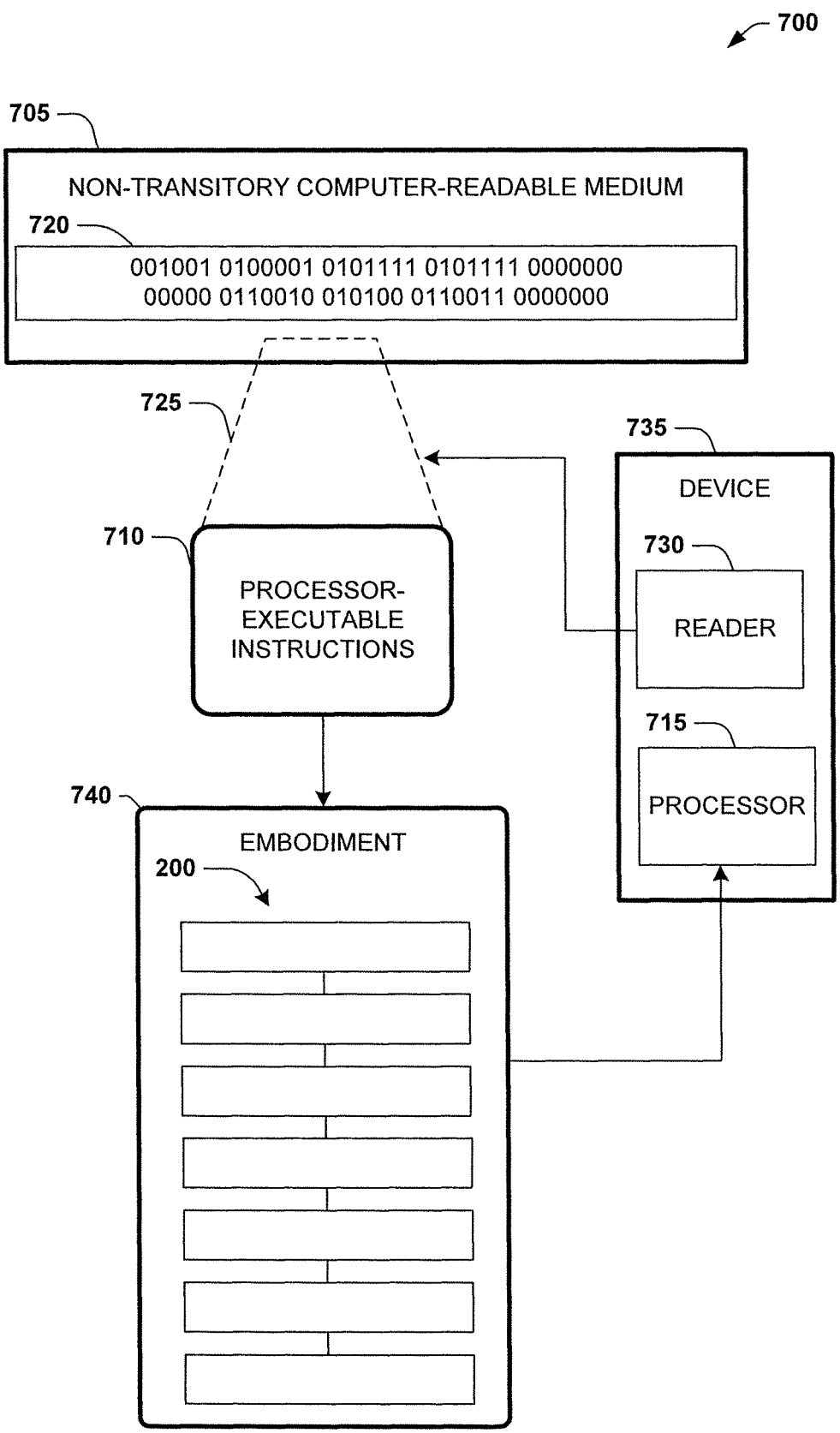
FIG. 7 illustrates an embodiment of a non-transitory computer-readable medium.

FIG. 7 is an illustration of a scenario 700 involving an example non-transitory computer-readable medium 705. In one embodiment, one or more of the components described herein are configured as program modules, such as the controller 105, stored in the non-transitory computer-readable medium 705. The program modules are configured with stored instructions, such as processor-executable instructions 710, that when executed by at least a processor, such as processor 715, cause the computing device to perform the corresponding function(s) as described herein. For example, functionality of the controller 105, stored in the non-transitory computer-readable medium 705, may be executed by the processor 715 as the processor-executable instructions 710 to perform an embodiment 740 of the method 200 of FIG. 2.

The non-transitory machine readable medium 705 includes the processor-executable instructions 710 that when executed by a processor 715 cause performance of at least some of the provisions herein. The non-transitory machine readable medium 705 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 705 stores computer-readable data 720 that, when subjected to reading 725 by a reader 730 of a device 735 (e.g., a read head of a hard disk drive, or a read operation invoked on a solid-state storage device), express the processor-executable instructions 710. In some embodiments, the processor-executable instructions 710, when executed cause performance of operations, such as at least some of the example method 200 of FIG. 2, for example. In some embodiments, the processor-executable instructions 710 are configured to cause implementation of a system, such as at least some of the example system 100 of FIG. 1, for example.

Figure 8:
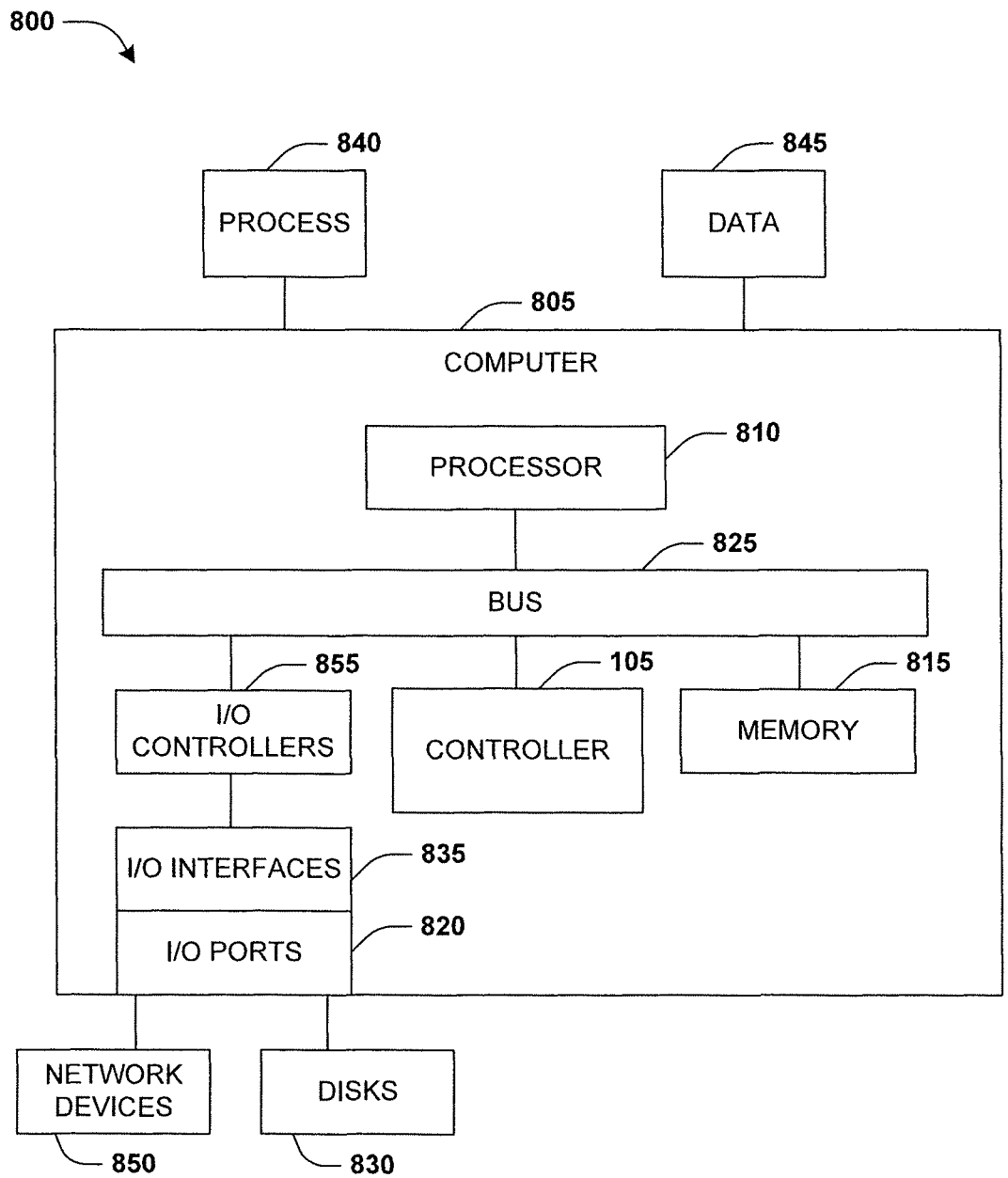
FIG. 8 illustrates an embodiment of a computing system configured with the example systems and/or methods disclosed.

FIG. 8 illustrates a scenario 800 of an example computing device that is configured and/or programmed with one or more of the example systems and methods described herein, and/or equivalents. The example computing device may be a computer 805 that includes a processor 810, a memory 815, and input/output ports 820 operably connected by a bus 825. In one example, the computer 805 may include logic of the controller 105 configured to facilitate the system 100 and/or the method 200 shown in FIGS. 1 and 2. In different examples, the logic of the controller 105 may be implemented in hardware, a non-transitory computer-readable medium 705 with stored instructions, firmware, and/or combinations thereof. While the logic of the controller 105 is illustrated as a hardware component attached to the bus 825, it is to be appreciated that in other embodiments, the logic of the controller 105 could be implemented in the processor 810, stored in memory 815, or stored in disk 830.

In one embodiment, logic of the controller 105 or the computer 805 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 805 as data 845 that are temporarily stored in memory 815 and then executed by processor 810.

The logic of the controller 105 may also provide means (e.g., hardware, non-transitory computer-readable medium 705 that stores executable instructions, firmware) for performing rule based source sequencing for allocation.

Generally describing an example configuration of the computer 805, the processor 810 may be a variety of various processors including dual microprocessor and other multi-processor architectures. The memory 815 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 830 may be operably connected to the computer 805 via, for example, an input/output (I/O) interface (e.g., card, device) 835 and an input/output port 820. The disks 830 may be, for example, a magnetic disk drive, a solid state disk drive, a floppy disk drive, a tape drive, a Zip drive, a flash memory card, a memory stick, and so on. Furthermore, the disks 830 may be a CD-ROM drive, a CD-R drive, a CD-RW drive, a DVD ROM, and so on. The memory 815 can store a process 840 and/or a data 845, for example. The disk 830 and/or the memory 815 can store an operating system that controls and allocates resources of the computer 805.

The computer 805 may interact with input/output (I/O) devices via the I/O interfaces 835 and the input/output ports 820. Input/output devices may be, for example, a keyboard, a microphone, a pointing and selection device, cameras, video cards, displays, the disks 830, the network devices 850, and so on. The input/output ports 820 may include, for example, serial ports, parallel ports, and USB ports. I/O controllers 855 may connect the I/O interfaces 835 to the bus 825.

The computer 805 can operate in a network environment and thus may be connected to the network devices 850 via the I/O interfaces 835, and/or the I/O ports 820. Through the network devices 850, the computer 805 may interact with a network. Through the network, the computer 805 may be logically connected to remote computers. Networks with which the computer 805 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer cause the computer to:
   generate a user interface;
   in response to receiving a request from the user interface, create a scheduling data structure that includes a plurality of tasks such that the scheduling data structure includes a hash table containing estimated times for the plurality of tasks, determine that the request is directed towards scheduling a first task to be performed using a first resource from a plurality of resources;
   access the scheduling data structure from a database via a network communication, wherein the scheduling data structure includes data records for:
      (i) a first set of tasks, upon which the first resource depends, to be performed using one or more other resources,
      (ii) a second set of tasks, upon which the one or more other resources depend, to be performed using the first resource,
      (iii) assigned candidate time slots for the first and second set of tasks, and
      (iv) dependencies between the first set of tasks and the second set of tasks;
   analyze the data records to determine the dependencies between the first set of tasks to be performed using the one or more other resources and the second set of tasks to be performed using the first resource;
   assign a candidate time slot for performing the first task using the first resource based upon the dependencies;
   display on the user interface a candidate schedule for the plurality of resources, including the first resource, using the assigned candidate time slot for the first task using the first resource;
   evaluate the candidate schedule to calculate a candidate schedule performance score based at least on a number of conflicts identified in the dependencies between the first and second set of tasks in the candidate schedule;
   display the candidate schedule performance score on the user interface;
   based at least on the candidate schedule performance score and the dependencies between the tasks and the resources, iteratively recalculate candidate time slots for performing the tasks until non-conflicting dependencies are determined, comprising:
      calculate a proposed start time and a proposed completion time for each of the plurality of tasks based upon a completion time of a previously calculated task and the estimated times in the hash table to generate modified candidate schedules until the start and completion times for at least one of the plurality of tasks are no longer changed and no conflicts exist between each of the plurality of tasks; and in response to determining when the proposed start times and the proposed completion times for at least one of the plurality of tasks are no longer changed and no conflicts exist between each of the plurality of tasks, regenerate the scheduling data structure, wherein the regenerated scheduling data structure includes a final candidate schedule;

transmit the regenerated scheduling data structure that shows the plurality of tasks with the non-conflicting dependencies to a user via the user interface, so that the user has access to up-to-date information about the regenerated scheduling data structure;

display on the user interface that the first task has been scheduled to be performed by the first resource; and cause the first resource to perform the first task.

2. The non-transitory computer-readable medium of claim 1, wherein the computer-executable instructions to evaluate the candidate schedule to calculate the candidate schedule performance score further include computer-executable instructions that when executed by the processor cause the computer to:

analyze the candidate schedule to determine the number of conflicts in dependencies between the first set of tasks and the second set of tasks in the candidate schedule; and generate the candidate schedule performance score based upon the number of conflicts in dependencies.

3. The non-transitory computer-readable medium of claim 2, wherein the conflicts in dependencies comprise at least one of:

(i) a conflict corresponding to a second task to be performed using the first resource having a time slot before a third task to be performed using a second resource, wherein the dependencies comprise a dependency of the second task to be performed using the first resource on the third task to be performed using the second resource; or (ii) a conflict corresponding to a fourth task to be performed using the second resource having a time slot before a fifth task to be performed using the first resource, wherein the dependencies comprise a dependency of the fourth task to be performed using the second resource on the fifth task to be performed using the first resource.

4. The non-transitory computer-readable medium of claim 1, wherein the dependencies used to calculate the candidate time slot for performing the first task using the first resource comprise at least one of:

(i) a dependency of the first task to be performed using the first resource on a second task to be performed using a second resource; or (ii) a dependency of a third task to be performed using the second resource on the first task to be performed using the first resource; and wherein the computer-executable instructions to calculate the candidate time slot for performing the first task using the first resource based upon the dependencies further include computer-executable instructions that when executed by the processor cause the computer to at least one of:

calculate the candidate time slot to be after a time slot of the second task based upon the dependency of the first task to be performed using the first resource on the second task to be performed using the second resource; or calculate the candidate time slot to be before a time slot of the third task based upon the dependency of the third task to be performed using the second resource on the first task to be performed using the first resource.

5. The non-transitory computer-readable medium of claim 1, wherein the dependencies used to calculate the candidate time slot for performing the first task using the first resource comprise at least one of:

(i) a dependency of a second task for the first resource on a third task for a second resource; or (ii) a dependency of a fourth task for the second resource on a fifth task for the first resource;

wherein the computer-executable instructions further include computer-executable instructions that when executed by the processor cause the computer to at least one of:

calculate a second candidate time slot for the second task for the first resource to be after a time slot of the third task based upon the dependency of the second task for the first resource on the third task for the second resource; or calculate a third candidate time slot for the fifth task for the first resource to be before a time slot of the fourth task based upon the dependency of the fourth task for the second resource on the fifth task for the first resource; and wherein the computer-executable instructions to generate the candidate schedule for the plurality of resources further include computer-executable instructions that when executed by the processor cause the computer to at least one of:

use the second candidate time slot for the second task for the first resource in the candidate schedule; or use the third candidate time slot for the fifth task for the first resource in the candidate schedule.

6. The non-transitory computer-readable medium of claim 1, wherein the first resource is a first vehicle, the first set of tasks are to be performed using one or more other vehicles, and the second set of tasks are to be performed by the first vehicle;

wherein the computer-executable instructions to determine that the candidate schedule performance score is greater than the existing schedule performance score of the existing schedule further include computer-executable instructions that when executed by the processor cause the computer to:

determine that the candidate schedule resolves a conflict in the existing schedule caused by a dependency between the first vehicle and at least one of the one or more other vehicles.

7. A computing system, comprising:

a processor connected to memory; and a scheduling module stored on a non-transitory computer readable medium and configured with instructions that when executed by the processor cause the processor to:

generate a user interface;

in response to receiving a request from the user interface, create a scheduling data structure that includes a plurality of tasks such that the scheduling data structure includes a hash table containing estimated times for the plurality of tasks, determine that the request is directed towards scheduling a first task to be performed using a first resource from a plurality of resources;

access the scheduling data structure from a database via a network communication, wherein the scheduling data structure includes data records for:
(i) a first set of tasks, upon which the first resource depends, to be performed using one or more other resources,
(ii) a second set of tasks, upon which the one or more other resources depend, to be performed using the first resource,
(iii) assigned candidate time slots for the first and second set of tasks, and
(iv) dependencies between the first set of tasks and the second set of tasks;

analyze the data records to determine the dependencies between the first set of tasks to be performed using the one or more other resources and the second set of tasks to be performed using the first resource;

assign a candidate time slot for performing the first task using the first resource based upon the dependencies;

display on the user interface a candidate schedule for the plurality of resources, including the first resource, using the assigned candidate time slot for the first task for the first resource;

evaluate the candidate schedule to calculate a candidate schedule performance score based at least on a number of conflicts identified in the dependencies between the first and second set of tasks in the candidate schedule;

display the candidate schedule performance score on the user interface;

based at least on the candidate schedule performance score and the dependencies between the tasks and the resources, iteratively recalculate candidate time slots for performing the tasks until non-conflicting dependencies are determined, comprising:
calculate a proposed start time and a proposed completion time for each of the plurality of tasks based upon a completion time of a previously calculated task and the estimated times in the hash table to generate modified candidate schedules until the start and completion times for at least one of the plurality of tasks are no longer changed and no conflicts exist between each of the plurality of tasks; and
in response to determining when the proposed start times and the proposed completion times for at least one of the plurality of tasks are no longer changed and no conflicts exist between each of the plurality of tasks, regenerate the scheduling data structure, wherein the regenerated scheduling data structure includes a final candidate schedule;

transmit the regenerated scheduling data structure that shows the plurality of tasks with the non-conflicting dependencies to a user via the user interface, so that the user has access to up-to-date information about the regenerated scheduling data structure;

display on the user interface that the first task has been scheduled to be performed by the first resource; and
cause the first resource to perform the first task.

8. The computing system of claim 7,
wherein the instructions to evaluate the candidate schedule to calculate the candidate schedule performance score further include instructions that when executed by the processor cause the processor to:

analyze the candidate schedule to determine the number of conflicts in dependencies between the first set of tasks and the second set of tasks in the candidate schedule; and
generate the candidate schedule performance score based upon the number of conflicts in dependencies.

9. The computing system of claim 8, wherein the conflicts in dependencies comprise at least one of:
(i) a conflict corresponding to a second task to be performed using the first resource having a time slot before a third task to be performed using a second resource, wherein the dependencies comprise a dependency of the second task to be performed using the first resource on the third task to be performed using the second resource; or
(ii) a conflict corresponding to a fourth task to be performed using the second resource having a time slot before a fifth task to be performed using the first resource, wherein the dependencies comprise a dependency of the fourth task to be performed using the second resource on the fifth task to be performed using the first resource.

10. The computing system of claim 7,
wherein the dependencies used to calculate the candidate time slot for performing the first task using the first resource comprise at least one of:
(i) a dependency of the first task to be performed using the first resource on a second task to be performed using a second resource; or
(ii) a dependency of a third task to be performed using the second resource on the first task to be performed using the first resource; and
wherein the instructions to calculate the candidate time slot for performing the first task using the first resource based upon the dependencies further include instructions that when executed by the processor cause the processor to at least one of:
calculate the candidate time slot to be after a time slot of the second task based upon the dependency of the first task to be performed using the first resource on the second task to be performed using the second resource; or
calculate the candidate time slot to be before a time slot of the third task based upon the dependency of the third task to be performed using the second resource on the first task to be performed using the first resource.

11. The computing system of claim 7,
wherein the dependencies used to calculate the candidate time slot for performing the first task using the first resource comprise at least one of:
(i) a dependency of a second task for the first resource on a third task for a second resource; or
(ii) a dependency of a fourth task for the second resource on a fifth task for the first resource;
wherein the instructions when executed by the processor cause the processor to at least one of:
calculate a second candidate time slot for the second task for the first resource to be after a time slot of the third task based upon the dependency of the second task for the first resource on the third task for the second resource; or
calculate a third candidate time slot for the fifth task for the first resource to be before a time slot of the fourth task based upon the dependency of the fourth task for the second resource on the fifth task for the first resource; and wherein the instructions to generate the candidate schedule for the plurality of resources further include instructions that when executed by the processor cause the processor to at least one of:
use the second candidate time slot for the second task for the first resource in the candidate schedule; or
use the third candidate time slot for the fifth task for the first resource in the candidate schedule.

12. The computing system of claim 7,
wherein the first resource is a first vehicle, the first set of tasks are to be performed using one or more other vehicles, and the second set of tasks are to be performed by the first vehicle;
wherein the instructions to determine that the candidate schedule performance score is greater than the existing schedule performance score of the existing schedule further include instructions that when executed by the processor cause the processor to:
determine that the candidate schedule resolves a conflict in the existing schedule caused by a dependency between the first vehicle and at least one of the one or more other vehicles.

13. A computer-implemented method performed by a computing device comprising a processor, the computer-implemented method comprising:
generating a user interface;
in response to receiving from the user interface a request, creating a scheduling data structure that includes a plurality of tasks such that the scheduling data structure includes a hash table containing estimated times for the plurality of tasks;
accessing, by at least the processor, the scheduling data structure from a database via a network communication, wherein the scheduling data structure includes data records for:
  (i) a first set of tasks, upon which a first resource depends, to be performed using one or more other resources,
  (ii) a second set of tasks, upon which the one or more other resources depend, to be performed using the first resource,
  (iii) assigned candidate time slots for the first and second set of tasks, and
  (iv) dependencies between the first set of tasks and the second set of tasks;
analyzing, by at least the processor, the data records to determine the dependencies between the first set of tasks to be performed using the one or more other resources and the second set of tasks to be performed using the first resource;
assigning, by at least the processor, a candidate time slot for performing a first task using the first resource based upon the dependencies, wherein the dependencies used to calculate the candidate time slot for performing the first task using the first resource comprise:
  (i) a dependency of the first task to be performed using the first resource on a second task to be performed using a second resource; and
  (ii) a dependency of a third task to be performed using the second resource on the first task to be performed using the first resource; and
wherein the computer-executable instructions to calculate the candidate time slot for performing the first task using the first resource based upon the dependencies further include computer-executable instructions that when executed by the processor cause the computer to;
calculate the candidate time slot to be after a time slot of the second task based upon the dependency of the first task to be performed using the first resource on the second task to be performed using the second resource; and
calculate the candidate time slot to be before a time slot of the third task based upon the dependency of the third task to be performed using the second resource on the first task to be performed using the first resource;
displaying on the user interface a candidate schedule for the plurality of resources, including the first resource, using the assigned candidate time slot for the first task for the first resource;
evaluating, by at least the processor, the candidate schedule to calculate a candidate schedule performance score;
displaying the candidate schedule performance score on the user interface;
the computer-implemented method further comprising iteratively:
calculating a second candidate time slot for performing a second task using a second resource, from the plurality of resources, based upon one or more dependencies and the hash table;
generating a second candidate schedule for the plurality of resources, including the second resource, using the second candidate time slot for the second task for the second resource;
evaluating the second candidate schedule to calculate a second candidate schedule performance score;
in response to determining that the second candidate schedule performance score is not greater than a second existing schedule performance score of a second existing schedule, calculating a third candidate time slot for performing the second task using the second resource, from the plurality of resources, based upon the one or more dependencies and the hash table; and
in response to determining that the second candidate schedule performance score is greater than the second existing schedule performance score of the second existing schedule, modifying and regenerating the scheduling data structure, based upon the second candidate schedule, to assign the second task to be performed using the second resource at the second candidate time slot;
transmitting the regenerated scheduling data structure to a user via the user interface, so that the user has access to up-to-date information about the regenerated scheduling data structure;
displaying on the user interface that the first task has been scheduled to be performed by the first resource; and
causing the first resource to perform the first task.

14. The computer-implemented method of claim 13,
wherein the evaluating the candidate schedule to calculate the candidate
schedule performance score further comprises:
analyzing the candidate schedule to determine a number of conflicts in dependencies between the first set of tasks and the second set of tasks in the candidate schedule; and
generating the candidate schedule performance score based upon the number of conflicts in dependencies.

15. The computer-implemented method of claim 14,
wherein the conflicts in dependencies comprise at least one of:

(i) a conflict corresponding to the second task to be performed using the first resource having a time slot before the third task to be performed using the second resource, wherein the dependencies comprise a dependency of the second task to be performed using the first resource on the third task to be performed using the second resource; or (ii) a conflict corresponding to a fourth task to be performed using the second resource having a time slot before a fifth task to be performed using the first resource, wherein the dependencies comprise a dependency of the fourth task to be performed using the second resource on the fifth task to be performed using the first resource.

16. The computer-implemented method of claim 13, wherein the dependencies used to calculate the candidate time slot for performing the first task using the first resource comprise at least one of:

(i) a dependency of the second task for the first resource on the third task for the second resource; or (ii) a dependency of a fourth task for the second resource on a fifth task for the first resource;

wherein the computer-implemented method further comprises at least one of:

calculating the second candidate time slot for the second task for the first resource to be after a time slot of the third task based upon the dependency of the second task for the first resource on the third task for the second resource; or calculating the third candidate time slot for the fifth task for the first resource to be before a time slot of the fourth task based upon the dependency of the fourth task for the second resource on the fifth task for the first resource; and wherein the generating the candidate schedule for the plurality of resources further comprises at least one of:

using the second candidate time slot for the second task for the first resource in the candidate schedule; or using the third candidate time slot for the fifth task for the first resource in the candidate schedule.

17. The non-transitory computer-readable medium of claim 1, wherein the computer-executable instructions further include computer-executable instructions that when executed by the processor cause the computer to iteratively:

calculate a second candidate time slot for performing a second task using a second resource, from the plurality of resources, based upon one or more dependencies and the hash table;

generate a second candidate schedule for the plurality of resources, including the second resource, using the second candidate time slot for the second task for the second resource;

evaluate the second candidate schedule to calculate a second candidate schedule performance score;

in response to determining that the second candidate schedule performance score is not greater than a second existing schedule performance score of a second existing schedule, calculate a third candidate time slot for performing the second task using the second resource, from the plurality of resources, based upon the one or more dependencies and the hash table; and in response to determining that the second candidate schedule performance score is greater than the second existing schedule performance score of the second existing schedule, modify and regenerate the scheduling data structure, based upon the second candidate schedule, to assign the second task to be performed using the second resource at the second candidate time slot.

18. The computing system of claim 7, wherein the instructions when executed by the processor cause the processor to iteratively:

calculate a second candidate time slot for performing a second task using a second resource, from the plurality of resources, based upon one or more dependencies and the hash table;

generate a second candidate schedule for the plurality of resources, including the second resource, using the second candidate time slot for the second task for the second resource;

evaluate the second candidate schedule to calculate a second candidate schedule performance score;

in response to determining that the second candidate schedule performance score is not greater than a second existing schedule performance score of a second existing schedule, calculate a third candidate time slot for performing the second task using the second resource, from the plurality of resources, based upon the one or more dependencies and the hash table; and in response to determining that the second candidate schedule performance score is greater than the second existing schedule performance score of the second existing schedule, modify and regenerate the scheduling data structure, based upon the second candidate schedule, to assign the second task to be performed using the second resource at the second candidate time slot.

* * * * *